Dec. 4, 1934.  N. B. WALES  1,982,846
COFFEEPOT
Filed Aug. 3, 1934    2 Sheets-Sheet 1

INVENTOR
Nathaniel B. Wales

Dec. 4, 1934.   N. B. WALES   1,982,846
COFFEEPOT
Filed Aug. 3, 1934   2 Sheets-Sheet 2
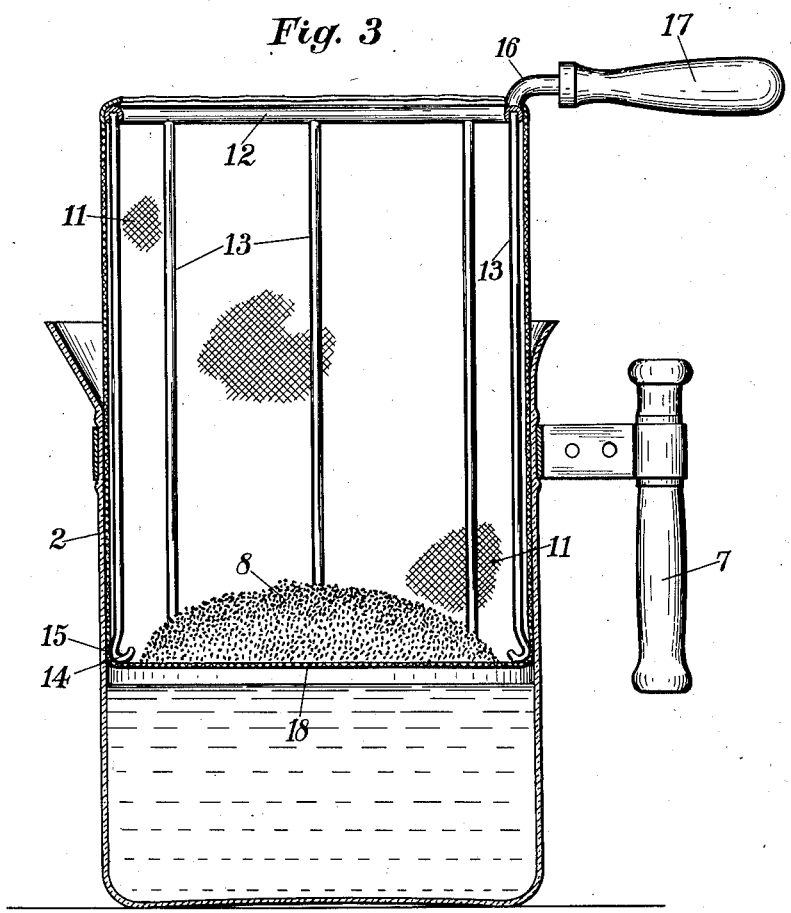
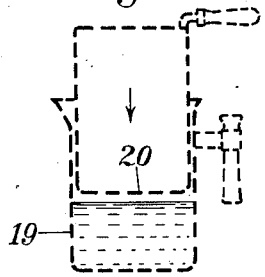
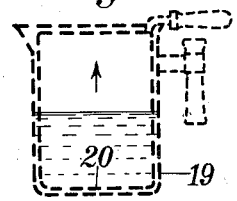
INVENTOR Patented Dec. 4, 1934

1,982,846

UNITED STATES PATENT OFFICE 1,982,846

COFFEEPOT

Nathaniel B. Wales, New York, N. Y.

Application August 3, 1934, Serial No. 738,221

6 Claims. (Cl. 53—3)

This invention relates to improvements in coffee pots and more particularly of a novel pot construction and manual movement made therewith whereby the pot is manipulated to obtain strong coffee in the very minimum of time.

The improvement further resides in a removable porous cloth covering of bag form and of great porosity made of cotton flannel, for instance, within which is placed the ground coffee and which closely fits the coffee pot's diameter and is under tension on a flexible skeleton form of novel construction, which permits substantially the entire liquid contents of the pot to reside within the cloth container, so that when the liquid has reached an infusion temperature of say 195 deg. F., the entire liquid contents in the pot can be drained through the coffee container by lifting the same upwards in the pot and then immediately lowering it again into the liquid, whereby the liquid is forced through the cloth and again passes through the coffee bed; in short, the coffee pot by manual manipulation of the container's handle produces a forced circulation of liquid through the coffee grounds approximating the action of a pump. This operation manually done three times instantly makes strong delicious tasting coffee, as the infusion is so quickly made at temperatures below boiling that the tannins and tart tasting components of the coffee are not extracted therefrom.

The coffee container, to carry out my invention, must be, therefore, easily lifted up and down in the pot by a convenient handle and the resilient wire frame skeleton helps to keep the container positively positioned in the glass pot by contacting with the same around its perimeter, making the pumping action most effective. I find that by having the cloth under tension, it is most easily cleaned of the grounds after each coffee making, as there are no wrinkles or folds to catch the coffee grounds.

Another novel feature is the design of the skeleton frame in which all the flexible members composing the same are in a longitudinal position in respect to its central vertical axis so that coffee grounds can be very easily flushed out of the container by water, there being no cross members to retain the coffee grounds, so that the removal of the cloth for cleaning is not necessary after each coffee brewing.

Referring to the following specifications, further objects and salient detail will be more concisely pointed out.

The drawings are illustrative only.

In Fig. 1, I show a vertical elevation of the coffee pot in partial section and completely assembled and shows the coffee containing plunger at the bottom of its stroke, its position during the heating of the liquid therein. In this embodiment, the coffee containing plunger is approximately the same diameter as the pot.

Fig. 2 is an end view looking downward into the coffee containing plunger.

Fig. 3 is a structural modification of Fig. 1 showing the resilient frame supporting the cloth and in fact forming a liquid sealing ring equivalent at the bottom of the coffee container to enhance the forced circulation of the liquid through the coffee bed by the manual pumping action thereon. This illustration shows the coffee containing plunger at the top of its stroke in respect to the liquid level as shown therein.

Fig. 4 is a schematic view of my invention showing the plunger at its top position in the pot to illustrate the pumping action.

Fig. 5 is a schematic view of my invention showing the coffee containing plunger at the bottom of its stroke.

Figure 1:
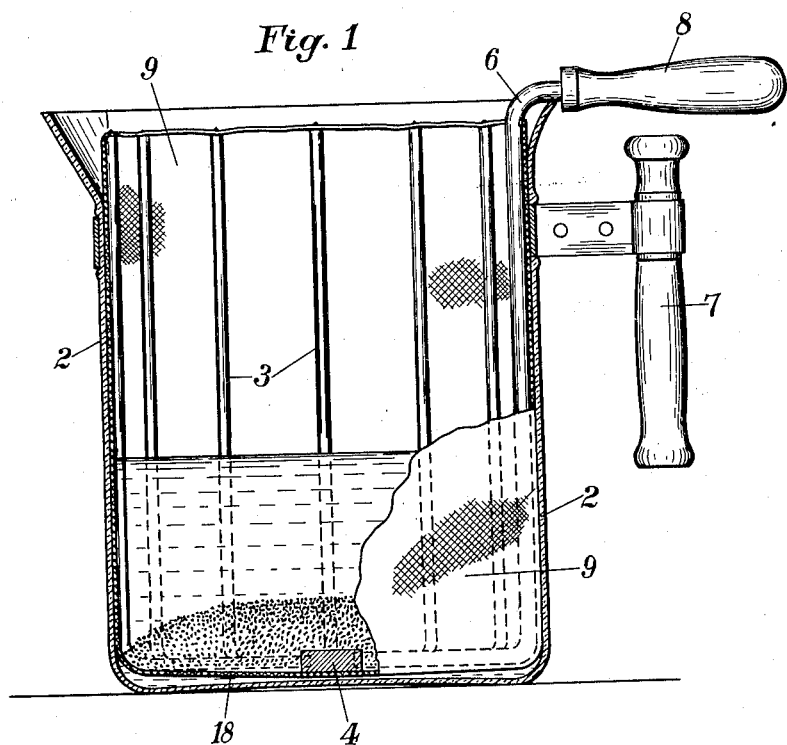

Referring more specifically to the drawings, in Fig. 1, numeral 2 represents the coffee pot of glass or metal of conventional pitcher shape with a heat insulated handle 7 secured thereto. 3 are a plurality of flexible metal rods rigidly secured at their lower ends to a central member 4.

In order to be able to make only one cup of coffee in a normal six cup size pot, it is essential that the bottom of the porous coffee container or plunger be very close to the bottom of the coffee pot so that with only a cupful of liquid therein on raising and lowering the porous container, the liquid will be high enough in respect to the bottom of the container to be forced in and out therethrough to effect a quick infusion.

The handle supporting member 6 is of larger diameter than the rods 3 and is comparatively rigid and is secured at its lower end to member 4 and carries a suitable heat insulated handle 8 at its upper extremity horizontal to the top of the pot 2. This member 6 may also serve as a stop to limit the downward movement of the forced circulation stroke. The member 6 conforms in shape to the other rods 3. The open ended cloth bag 9 which fits over the skeleton frame made up of rods 3 and handle rod 6 is secured thereon by the ends of the rods 3 protruding within the cloth itself as they in unison hold it under tension.

Figure 2:
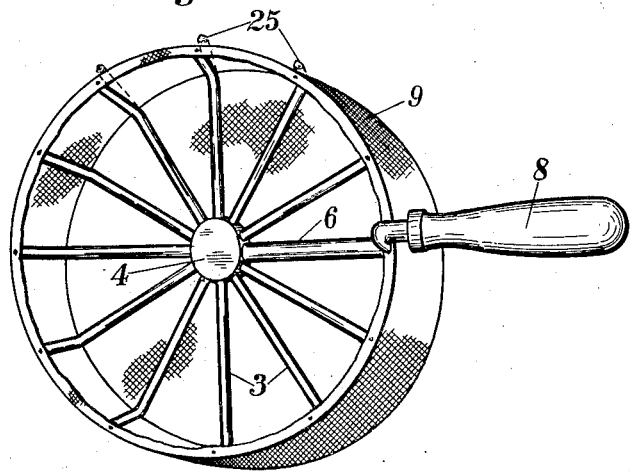

Due to the normal position of the rods 3, as seen at 25, Fig. 2, as and when the cloth bag is drawn on to the skeleton frame, the rods 3 are sprung inward from their normal positions 25 and hold the cloth under tension. The sides of the cloth bag thereby form a rigid walled surface when inserted into the pot, as seen in Fig. 1. The rods 3 supporting the cloth bag 9 extend to approximately the top of the pot 2 and are well above any normal liquid level in the coffee pot.

Referring to Fig. 3, a modified construction, the supporting frame for the cloth bag 11 is composed of a rigid ring 12 from which project downwardly flexible metal rods 13 and which terminate in inwardly curved arcs 14 which make it easy to guide the plunger into the coffee pot and which are under tension as and when the bag 9 is drawn over them and proportioned to produce a "sealing ring" contact 15 on the inner wall of the coffee pot near the base perimeter of the cloth bag and forming thereby an effective plunger-effect to give maximum forced circulation up through the bag as and when it is forced downward into the liquid. One end 16 of the rigid ring 12 may serve as a handle 17 in this modification. Fig. 3 illustrates the coffee containing plunger 18 at its raised position and about to be forced downward into the liquid.

In the schematic Figs. 4 and 5, 19 is the coffee pot, 20 is the coffee containing plungers. These serve to clearly illustrate the forced circulation through the coffee bed caused by the pump like coffee containing plunger.

It may be seen that the wire frame with its vertical rod element 3 under outward tension against the cloth bag forms the bag into a polygon section with only points of contact on the inside wall of the pot at spaced intervals thereof. This construction produces the following desirable action as and when the plunger 20 is forced up and down. Due to the spaced actual contacts with the inner wall of the pot 19, the plunger 20 forms a plurality of rising columns of liquid on the sides of the plunger as and when depressed in the pot causing the porous sides of the plunger 20 to absorb these liquid columns therethrough and thereby make effective as a membrane the outer elevated side wall of the plunger as well as its bottom. This permits the great rapidity of pump action and infusion obtained.

The operation of my device is as follows. Insert the open topped coffee container, as shown in Fig. 2, into the pot 2 by handle 8. Pour into it a measured quantity of ground coffee. Then pour a measured amount of cold water into the open topped container so it falls over the ground coffee therein. Place the pot on the stove or any heat source. When the water in the pot reaches a temperature just below boiling, hold the handle 7 (in Fig. 1) with one hand and grasp the handle 8 with the other hand and quite rapidly raise and lower handle 8 for three or four times. The relatively large area of the porous bag permits the liquid to be forced upward through the bag on the downward stroke and gravity causes it to drain rapidly out on the upward stroke. If one watches closely, the coffee can be seen to change its color to a darker hue on each stroke. When the coffee appears to be dark enough as seen through the glass pitcher, raise the coffee container out of the pot entirely and serve the coffee directly from the pot.

This device is exceedingly practicable and of low cost, easily cleaned and makes delicious bell clear coffee in four to five minutes.

What I desire to protect and claim as new by United States Letters Patent is encompassed in the following claims.

1. A coffee pot of the type described comprising a coffee pot, an open topped porous bag slidably fitting within said pot and extending from the approximate top to the bottom of the same, and a supporting frame therefor within said bag composed of longitudinally radiating rods unsecured at their upper ends and secured one to the other at their lower ends, each rod under individual outward tension against the sides of said bag, and means thereby to secure said bag to said frame.

2. A coffee pot of the type described comprising a coffee pot, an open topped porous bag slidably fitting within said pot and extending from the approximate top to the bottom of the same, and a supporting frame therefor within said bag composed of longitudinally radiating rods unsecured at their upper ends and secured one to the other at their lower ends, each rod under individual outward tension against the sides of said bag, and means thereby to secure said bag to said frame, and handle means therefor attached to the upper elongated extremity of one of said rods.

3. In combination with a pot, a resilient frame co-extensive therewith, an open topped porous bag supported by said frame and substantially contacting the sides of said pot, and means to reciprocate the frame and bag to secure a plunger action between the coffee and the water.

4. In combination with a pot, a skeleton frame co-extensive therewith, an open topped porous bag supported under tension, both circumferentially and axially, by said frame, and means to reciprocate the frame and bag to secure a plunger action between the coffee and the water therein.

5. In combination with a pot, a resilient frame co-extensive therewith, an open topped porous bag supported by said frame and contacting against the sides of said pot, and a handle on said frame to reciprocate the frame and bag to secure a plunger action between the coffee and the water.

6. In combination with a pot, a resilient frame co-extensive therewith, an open topped porous bag supported by said frame, means on the resilient frame to tightly distend said bag, both circumferentially and axially thereof, and handle means on the frame to reciprocate the frame and bag to secure a plunger action between the coffee and the water therein.

NATHANIEL B. WALES.